(12) United States Patent
Daniel

(10) Patent No.: US 7,544,045 B2
(45) Date of Patent: Jun. 9, 2009

(54) COOLING TOWER FAN LOCKING APPARATUS

(75) Inventor: Shawn E. Daniel, Seabrook, TX (US)

(73) Assignee: Cooling Towers of Texas, LaPorte, TX (US)

( * ) Notice: Subject to any disclaimer, the term of this patent is extended or adjusted under 35 U.S.C. 154(b) by 465 days.

(21) Appl. No.: 11/533,157

(22) Filed: Sep. 19, 2006

(65) Prior Publication Data

US 2006/0292004 A1    Dec. 28, 2006

Related U.S. Application Data

(60) Provisional application No. 60/812,818, filed on Jun. 12, 2006.

(51) Int. Cl.
*F03D 7/02* (2006.01)

(52) U.S. Cl. ............................................... 416/169 R
(58) Field of Classification Search ................... 416/14, 416/169 R, 244 R
See application file for complete search history.

(56) References Cited

U.S. PATENT DOCUMENTS

| | | | | |
|---|---|---|---|---|
| 270,882 A | * | 1/1883 | Bachman | 416/169 R |
| 801,638 A | * | 10/1905 | Bateman | 416/169 R |
| 1,941,611 A | * | 1/1934 | Manikowske | 416/169 R |
| 7,168,533 B2 | * | 1/2007 | Podratzky | 416/169 R |

* cited by examiner

*Primary Examiner*—Igor Kershteyn
(74) *Attorney, Agent, or Firm*—Thompson Coburn LLP

(57) ABSTRACT

A mechanical locking apparatus is assembled to an existing cooling tower fan assembly and is operable to brake the drive shaft of the fan assembly to stop rotation of the fan and isolate the fan from rotating in high winds.

23 Claims, 3 Drawing Sheets

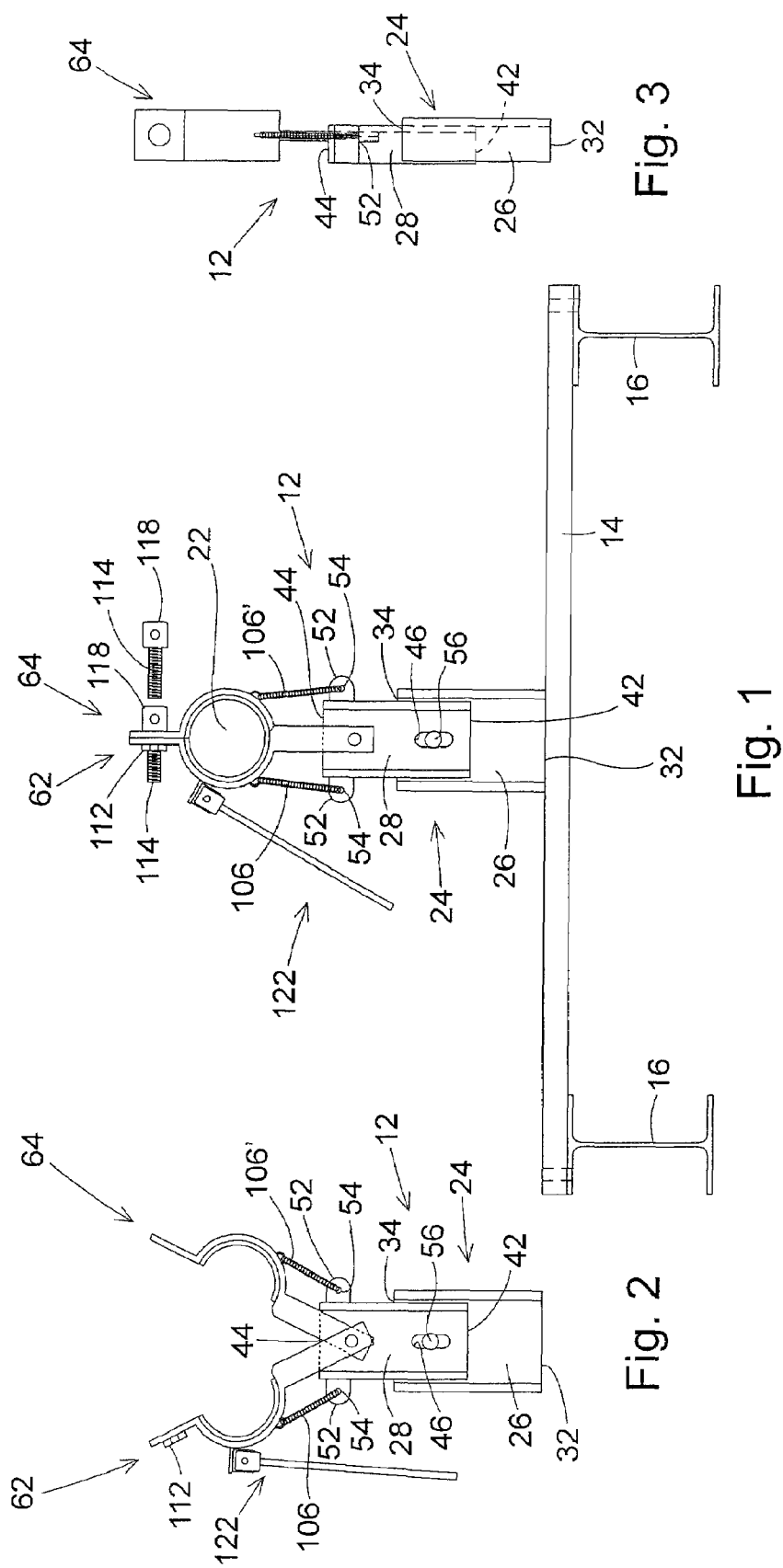

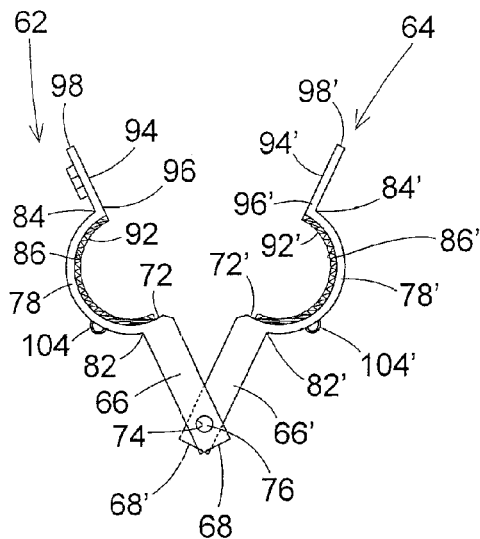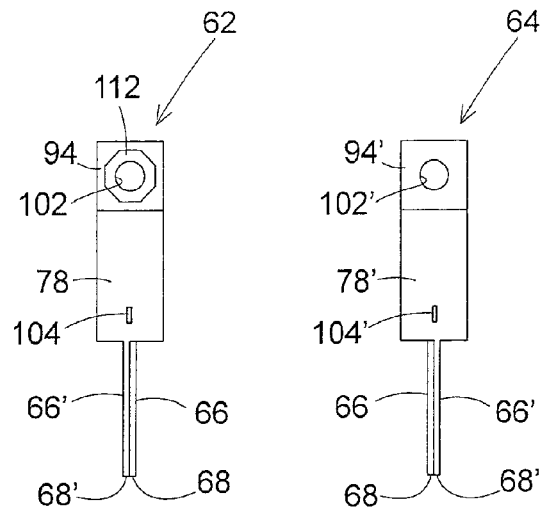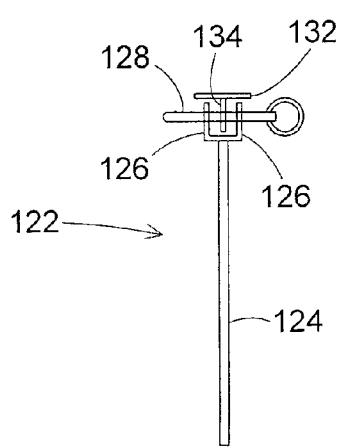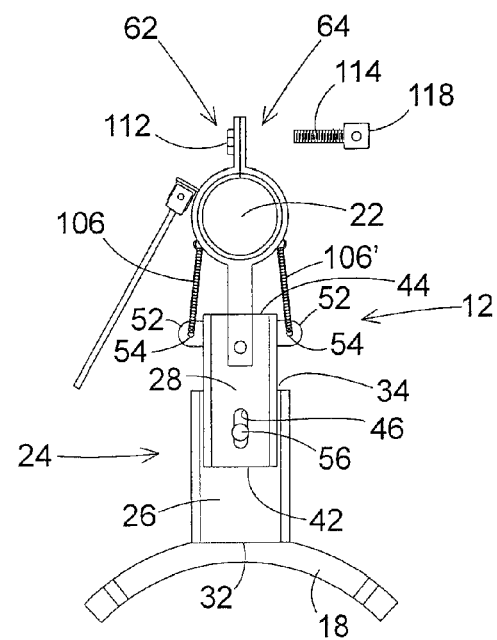
Fig. 8　　　Fig. 9　　　Fig. 10　　　Fig. 11　　　Fig. 12

COOLING TOWER FAN LOCKING APPARATUS

This patent application claims the benefit of provisional patent application No. 60/812,818, filed Jun. 12, 2006.

BACKGROUND OF THE INVENTION (1) Field of the Invention

The present invention pertains to a mechanical locking apparatus that is assembled to an existing cooling tower fan assembly and is operable to brake the drive shaft of the fan assembly, keeping the fan from rotating in high winds.

(2) Description of the Related Art

A cooling tower is a structure that is used to cool a liquid, typically water, that is heated by the operation of an air conditioning system of a large building, a refinery, a petrochemical facility, a manufacturing facility, an electric power generation facility, or other similar facility. The cooling tower is typically constructed on the top of a building or other similar structure, or in an open area of a refinery, petrochemical facility, power generation facility, etc. where it is directly exposed to the atmosphere. The heated water is directed into the interior of the cooling tower and falls by gravitation over surfaces in the tower interior. The surfaces spread the heated water, exposing the water to the atmosphere which results in cooling of the water. To assist in cooling the water, large fan assemblies are typically employed to produce an induced draft through the cooling tower. In each fan assembly, a fan is mounted on a reduction gearing system that is rotated by a drive shaft connected to a motor. Rotation of the fan produces a counter flow or cross flow of cooling air upwardly or crosswise through the tower, opposite or perpendicular to the downward flow of the water to be cooled.

The construction of the typical cooling tower is open to the atmosphere to assist in the cooling of the heated water passed through the tower. This open construction exposes the fan in the tower to high winds. In very high wind situations produced by storms, in particular by hurricanes, the high winds can cause the fan to rotate at a high rate of speed. As wind speeds increase, the fan will rotate faster and faster. When the high winds reach a point that the wind load on the cooling tower fan stack surrounding the fan causes the fan stack to flex toward the rotating fan blades, the rotating fan blades can impact with the flexing cooling tower fan stack. Due to the rotating speed of the fan, the impact can shatter the fan, damage the reduction gearing and the drive shaft of the fan, and damage the cooling tower fan stack surrounding the fan, making the fan stack more susceptible to being torn from the cooling tower on the roof top of a building or in the open area of a refinery, petrochemical facility, power plant, etc., by the high force winds.

SUMMARY OF THE INVENTION

The cooling tower fan locking apparatus of the invention overcomes the above discussed disadvantages of existing cooling tower fan constructions by providing a locking or braking apparatus on the drive shaft that prevents uncontrolled rotation of the fan due to high wind conditions in the atmosphere. The locking apparatus of the invention is designed to be positioned around the drive shaft coupling of an existing cooling tower. When high wind conditions are forecast in the area of the cooling tower fan, the locking apparatus can be easily engaged to lock the drive shaft stationary relative to the cooling tower and prevent uncontrolled rotation of the fan in the high wind conditions.

The apparatus of the invention is basically comprised of a support member and a pair of lock members that are mounted on the support member for pivoting movement toward and away from each other. In the preferred embodiment of the invention, all of the component parts of the apparatus are constructed of stainless steel.

The support member is adapted to be secured to an existing stationary structure of the cooling fan at a position adjacent to the fan shaft. The support member has an adjustable length. With the support member secured to the stationary structure, the length of the support member can be adjusted toward and away from the fan shaft adjacent the structure.

The two lock members have the same basic construction and are substantially mirror images of each other. With the constructions of the first and second lock members being similar, their manufacturing costs are reduced.

The first lock member has an elongate, rectangular base plate that is mounted to the support member by a pivot pin connection. The base plate extends from the pivot pin connection toward our side of the fan shaft.

A brake band is secured to the end of the base plate. The length of the base plate extending from the support member positions the brake band on one side of the fan shaft. The brake band has a curved surface that is dimensional to engage around approximately one-half of the circumference of the fan shaft. In the preferred embodiment of the invention, a non-metallic braking material is secured to the curved surface of the brake band. The braking material provides the engagement surface that engages with the side of the fan shaft when braking the fan shaft.

A retainer or lock flange is secured to the opposite end of the brake band from the base plate. A hole passes through the center of the retainer flange. A threaded nut is secured to the retainer flange and aligned with the hole.

A coil spring is connected between the first lock member and the support member. The coil spring biases the first lock member to pivot away from the fan shaft to a first position of the lock member relative to the stationary structure where the braking material of the first lock member is spaced from the fan shaft.

A brake and bolt leverage handle is removably attached to the first lock member by a pin. The handle provides leverage to move the first lock member against the bias of the spring when pivoting the first lock member toward the fan shaft. The handle can be removed from the first lock member by removing the pin.

The second lock member, as stated earlier, is basically a mirror image of the first lock member. The second lock member also has a base plate that is mounted by the pivot pin connection to the support member.

A brake band is secured to the base plate. The brake band has a curved surface that is dimensioned to engage around the opposite side of the fan shaft from the curved surface of the first lock member.

A retainer flange extends from the end of the second lock member brake band. The retainer flange has a center hole.

The second lock member is also biased away from the fan shaft by a coil spring connected between the second lock member and the support member.

When the locking apparatus is not in use, the two springs bias the first and second lock members to first positions of the lock members relative to the stationary structure. In the first positions the two lock members are spaced away from the opposite sides of the fan shaft. The braking materials of the two lock members are also spaced away from the fan shaft and do not resist free rotation of the fan shaft.

When it is desired to lock or brake the fan shaft against rotation, the two lock members are moved toward each other from their first positions spaced away from the fan shaft, to second positions of the two lock members where their braking materials engage around the opposite sides of the fan shaft. This positioning of the two lock members positions the lock member's retainer flanges side by side. A threaded bolt having a flat key projecting from its head is inserted through the retainer flange hole of the second lock member and is screw threaded into the nut secured to the retainer flange of the first lock member. The brake/bolt handle is used to engage the key at the head of the bolt to tighten the bolt. As the bolt is tightened, the first lock member and second lock member are moved toward each other. This moves the braking material of the first lock member into engagement with one side of the fan shaft and moves the braking material of the second lock member into engagement with the other side of the fan shaft. The bolt functions as a retainer that holds the braking materials of the first and second lock members in engagement with the fan shaft. This securely brakes or holds the fan shaft against rotation in the wind.

In this manner, the fan shaft is braked by the fan locking apparatus of the invention, and high wind conditions in the atmosphere of the cooling tower are prevented from rotating the fan.

When the high wind conditions in the atmosphere cease, the bolt is removed from its connection to the retainer flanges of the first and second lock members, and the springs bias the first and second lock members back to their first positions relative to the fan shaft. This disengages the braking material of the first and second lock members from the opposite sides of the fan shaft, and the fan shaft is free for rotation.

BRIEF DESCRIPTION OF THE DRAWING FIGURES

Further features of the invention are set forth in the following detailed description of the preferred embodiment of the invention and in the drawing figures.

FIG. 1 is a top plan view of the apparatus of the invention mounted to a stationary structure adjacent a fan shaft.

FIG. 2 is a view of the apparatus shown in FIG. 1 removed from the stationary structure and with the lock members of the apparatus moved to their first relative positions.

FIG. 3 is a right side view of the apparatus shown in FIG. 1 removed from the stationary structure.

FIG. 8 is a top view of the lock members of the apparatus removed from the remaining structure of the apparatus.

FIG. 9 is a left side view of the lock member shown in FIG. 8.

FIG. 10 is a right side view of the lock member shown in FIG. 8.

FIG. 11 is a view of the brake/bolt handle removed from the apparatus.

FIG. 12 is a top plan view of the apparatus of the invention attached to an alternate stationary structure.

DETAILED DESCRIPTION OF THE PREFERRED EMBODIMENT OF THE INVENTION

Figure 7:
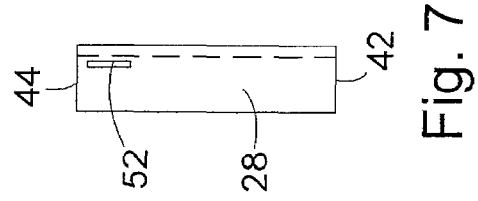
FIG. 7 is a side view of the support member portion shown in FIG. 6.

The cooling tower fan locking apparatus of the invention is designed to hold the fan shaft of a cooling tower fan against free rotation due to high wind conditions in the atmosphere. The apparatus of the invention is designed to be secured to an existing stationary structure of a cooling tower adjacent to the fan shaft of the cooling tower. What is meant by "fan shaft" is any shaft of the cooling tower assembly that is rotated by a motive source of the cooling tower and is operatively connected to a fan of the cooling tower to rotate the fan. FIGS. 1 and 12 of the drawing figures show the apparatus 12 of the invention secured to examples of stationary structures of a cooling tower. In the preferred embodiment of the apparatus 12, all of the apparatus component parts are stainless steel. FIG. 1 shows a stainless steel channel 14 that is employed to operatively connect the apparatus 12 to stationary structures 16 of a cooling tower, for example unitized supports 16 of the cooling tower. FIG. 12 shows a rolled steel plate 18 that is used to secure the apparatus 12 to an existing torque tube (not shown) of the cooling tower. The apparatus 12 is preferably secured by welding to the channel 14 of FIG. 1 and the rolled plate 18 of FIG. 12. The channel 14 and rolled plate 18 are only two examples of methods employed to operatively connect the apparatus 12 to a stationary structure of a cooling tower adjacent the fan shaft 22 of the cooling tower.

In FIGS. 1 and 12, the fan shaft 22 is shown in cross-section. In both embodiments of the invention shown in FIGS. 1 and 12, when high wind conditions are forecast in the area of the cooling tower fan, the apparatus 12 can be easily engaged to hold the fan shaft 22 against rotation relative to the stationary structure of the cooling tower and prevent uncontrolled rotation of the fan in the high wind conditions.

The apparatus of the invention is basically comprised of a support member 24 and a pair of lock members. The pair of lock members are mounted on the support member for pivoting movement of the lock members between first positions of the lock members where they are spaced away from each other and spaced on opposite sides of the fan shaft 22, and second positions of the lock members where they are moved toward each other and into engagement with the opposite sides of the fan shaft 22. As stated earlier, in the preferred embodiment of the invention all of the component parts of the apparatus are constructed of stainless steel. In addition, the component parts are connected together by welds, unless otherwise noted herein.

Figure 6:
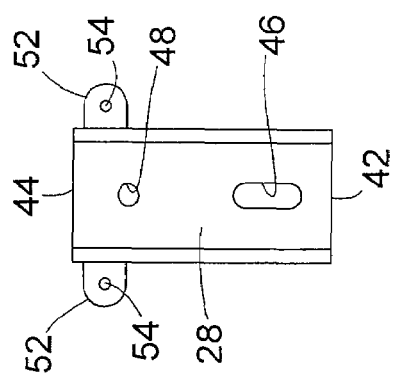
FIG. 6 is a top view of an additional portion of the support member.
Figure 5:
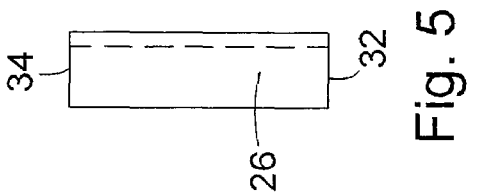
FIG. 5 is a side view of the support member portion shown in FIG. 4.
Figure 4:
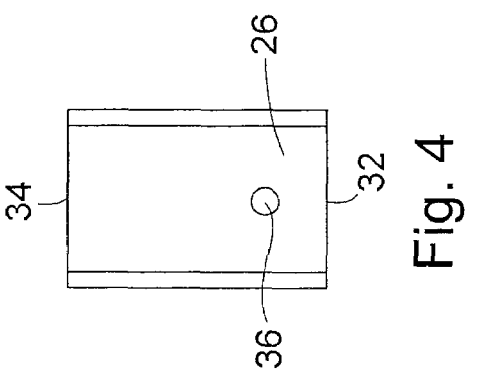
FIG. 4 is a top view of a portion of the support member.

The support member 24 has a two piece construction that includes a fixed channel 26 and an adjustable channel 28. Both of the channels 26, 28 have general U-shaped cross sections as shown in FIGS. 4-7. The fixed channel 26 has a proximal end 32 that is adapted for attachment to a stationary structure of the cooling fan positioned adjacent the fan shaft 22, for example, the channel 14 shown in FIG. 1 or the plate 18 shown in FIG. 12. The fixed channel has a distal end 34 opposite the proximal end 32. The fixed channel 26 extends from its proximal end 32 toward the fan shaft 22 when the channel is secured to the stationary structure of the cooling tower. A fastener hole 36 in the middle of the channel.

The adjustable channel 28 also has a general U-shaped cross section. The width of the adjustable channel 28 is determined to allow it to fit into the U-shaped cross-section of the fixed channel 26 as shown in FIGS. 1-3 and 12. The adjustable channel 28 has a length that extends from a proximal end 42 of the adjustable channel 28 to an opposite distal end 44 of the channel. An oblong slot 46 is provided through the adjustable channel 28. The slot 46 is positioned at the center of the adjustable channel 28 and extends along a portion of the length of the adjustable channel. A pin hole 48 is also provided through the adjustable channel 28 adjacent the channel distal end 44. A pair of tabs 52 project outwardly from the opposite sides of the adjustable channel 28 adjacent the channel distal end 44. Each of the tabs 52 has a hole 54 through the tab.

A threaded fastener 56, for example a nut and bolt fastener, extends through the slot 46 of the adjustable channel 28 and the hole 36 of the fixed channel 26. The fastener 46 extending through the slot 46 allows the adjustable channel 28 to be adjustably positioned on the fixed channel 26 toward and away from the fan shaft 22. Tightening the fastener 56 fixes the adjustable channel 28 in its adjusted position to the fixed channel 26.

The first lock member 62 and the second lock member 64 have the same basic construction and are, for the most part, mirror images of each other. The lock members are shown removed form the apparatus in FIGS. 8-10. With the constructions of the first lock member 62 and the second lock member 64 being basically the same, their manufacturing costs are reduced. In the preferred embodiment, the lock members 62, 64, as well as the other component parts of the apparatus, are primarily constructed of one quarter inch thick steel. Because the first lock member 62 and the second lock member 64 are similar in construction, the construction of only the first lock member 62 will be described in detail.

The first lock member 62 includes a rectangular base plate 66 that has an elongate configuration extending between opposite proximal 68 and distal 72 ends. A pivot hole 74 is provided through the base plate 66 adjacent the proximal end 68. A pivot pin 76 extends through the pivot hole 74, mounting the first base plate 66 to the support member 24. The pivot pin 76 mounts the first base plate 66 and the first lock member 62 to the support member 24 for pivoting movement between first and second positions of the base plate 66 and lock member 62 relative to the support member 24 and to the stationary structure of the cooling tower. The pivot pin 76 can be a threaded fastener or other equivalent fastener that enables the pivoting movement of the base plate 66 and first lock member 62. As seen in FIG. 2, the pivoting movement of the base plate 66 and the first lock member 62 is limited by a side portion of the adjustable channel 28. Thus, the pin 76 provides a pivot connection between the first base plate 66 and first lock member 62 that allows the lock member to move from a first position of the lock member 62 relative to the support member 24 shown in FIG. 2, to a second position of the first lock member 62 relative to the support member 24 shown in FIG. 1.

A first brake band 78 is secured to the distal end 72 of the first base plate 66 by a weld. The length of the first base plate 66 positions the first brake band 78 at one side of the fan shaft 22 when the apparatus is secured to the cooling towers stationary structure 16. The brake band 78 has a width dimension that is substantially the same as the width dimension of the base plate 66. The first brake band 78 has a length that extends from a proximal end 88 of the band secured to the base plate distal end 72, to an opposite distal end 84 of the brake band. The length of the first brake band 78 and the radius of curvature of the first brake band 78 are determined to allow a concave interior surface 86 of the brake band to extend around approximately one half of the circumference of the fan shaft 22.

A layer of a braking material 92 is secured to the curved surface 86 of the first brake band 78. The braking material 92 provides an engagement surface that engages with the one side of the fan shaft 22 when braking the fan shaft. The braking material 92 also prevents damage to the fan shaft 22 when braking the fan shaft.

A first retainer flange 94 extends from the first brake band 78. The retainer flange 94 has a general rectangular configuration and has a proximal end 96 that extends from the brake band distal end 84 at a bend formed between the retainer flange and brake pad. The length of the retainer flange 94 extends from the proximal end 96 of the flange connected to the first brake band 78 to an opposite distal end 98 of the flange. A hole 102 passes through the center of the first retainer flange 94.

A small hook or hoop 104 is secured to the first brake band 78. The hook 104 is secured to the convex surface of the brake band 78 that is opposite the band curved surface 86.

A first coil spring 106 extends between the first brake band hook 104 and the tab hole 54 in the left-side tab 52 shown in FIG. 1. The first spring 106 biases the first lock member 62 to its first position relative to the support member 24 and the cooling tower stationary structure 16 shown in FIG. 2. Moving the first lock member 62 from its first position shown in FIG. 2 to its second position shown in FIG. 1 is done against the bias of the spring 106. Thus, the spring 106 biases the first lock member 62 to pivot away from the fan shaft 22 to the first position of the lock member 62 relative to the fan shaft 22 and the stationary structure 16 where the braking material 92 of the first lock member 62 is spaced from engagement with the fan shaft 22.

As stated earlier, the construction of the second lock member 64 is basically a mirror image of the first lock member 62 described above. Therefore, the construction of the second lock member is shown in the drawing figures with the component parts of the second block member 64 that are the same as those of the first lock member 62 being shown with the same reference numbers followed by a prime ('). Because the construction of the second lock member 64 is basically the same as that of the first lock member 62, the constructions of the component parts of the second lock member 64 will not be again described in detail.

The first lock member 62 differs from the second lock member 64 in that it is provided with a threaded nut 112 that is secured to the first lock member retainer flange 94 by welds. The nut 112 is centered relative to the retainer flange hole 102.

A retainer in the form of a screw-threaded bolt 114 is provided to secure and hold the first lock member 62 to the second lock member 64 in their second relative positions shown in FIG. 1. The screw threading of the bolt 114 is complementary to the internal screw threading of the nut 112 secured to the first lock member retainer flange 94. The bolt 114 has a flat key 118 projecting from the head of the bolt. The bolt 114 is shown in FIGS. 1 and 12 in a position removed from the first lock member 62 and second lock member 64, and is shown in FIG. 1 in a position where the bolt 114 holds the first lock member 62 and the second lock member 64 in their second positions relative to the support member 24 and the cooling tower stationary structure 16.

The first lock member 62 also differs from the second lock member 64 in that a tool 122 is removably mounted on the first lock member 62. The tool 122 is used to provide leverage to the first lock member 62 for engaging the first lock member 62 against a rotating fan shaft to brake the shaft, and is also used in turning the retainer bolt 114. The tool 122 is shown removed from the first lock member 62 in FIG. 11. The tool 122 has an elongate handle 124 and a pair of forked prongs 126 at one end of the handle. Each of the prongs 126 has a center hole that passes through the prong. A pin 128 having a ball detent at one end and a ring at the opposite end is inserted through the aligned holes of the prongs 126.

A T-shaped tool mount 132 is secured to the first lock member brake band 78 just above the spring hook 104. A center web 134 of the T-shaped mount 132 has a hole therethrough that is dimensioned to receive the pin 128 of the tool 122. The mount web 134 is positioned between the prongs 126 of the tool 122, and the pin 128 is inserted through the aligned holes of the prongs 126 and the web 134 in removably attaching the tool 122 to the first lock member 62.

When the fan locking apparatus 12 is not in use, the two springs 106, 106' bias the first lock member 62 and the second lock member 64 to their first positions relative to the support member 24 and the cooling tower stationary structure 16 shown in FIG. 2. In the first positions of the two lock members 62, 64, the engagement surfaces of the braking materials 92, 92' are spaced away from the opposite sides of the fan shaft 22. Thus, the braking materials 92, 92' do not resist free rotation of the fan shaft 22.

When it is desired to lock or brake the fan shaft 22 against free rotation in the wind, the first lock member 62 and second lock member 64 are moved away from their first positions and toward their second positions shown in FIGS. 1 and 12. This also moves the first lock member 62 and the second lock member 64 toward the opposite sides of the fan shaft 22. The tool 122 attached to the first lock member 62 can be used to gain leverage on the first lock member 62 in moving it toward its second position to engage and brake the rotating fan shaft. As the two lock members 62, 64 are moved toward their second positions, the retainer flanges 94, 94' of the two lock members approach each other. As the retainer holes 102, 102' of the two retainer flanges 94, 94' approach each other, the threaded bolt retainer 114 can be inserted through the hole 102' of the second lock member retainer flange 94' and screw threaded into the hole 102 of the first lock member retainer flange 94. This holds the first lock member 62 and the second lock member 64 together against the bias of the coil springs 106, 106'.

The tool 122 can be removed from the first lock member 62 by removing the tool pin 128, and the tool prongs 126 can be positioned on the opposite sides of the bolt key 118 to assist in turning the bolt. As the bolt 114 is turned in the nut 112 on the first lock member retainer flange 94, the first lock member 62 and the second lock member 64 are moved toward each other on opposite sides of the fan shaft 22. This moves the braking material 92 of the first lock member 62 into engagement with one side of the fan shaft 22 and moves the braking material 92' of the second lock member 64 into engagement with the other side of the fan shaft. Thus, the bolt 114 functions as a retainer that holds the braking materials 92, 92' of the respective first 62 and second 64 lock members in engagement with the opposite sides of the fan shaft 22. This securely brakes or holds the fan shaft 22 against rotation in the wind.

In this manner, the fan shaft 22 is braked by the fan locking apparatus 12, and high wind conditions in the atmosphere of the cooling tower are prevented from rotating the fan.

When the high wind conditions in the atmosphere cease, the bolt 114 is removed from its connection between the retainer flanges 94, 94' of the first and second lock members 62, 64. The springs 106, 106' then bias the respective first and second lock member 62, 64 back to their first positions relative to the fan shaft 22 shown in FIG. 2. This disengages the braking materials 92, 92' of the first and second lock members 62, 64 from the opposite sides of the fan shaft 22, and the fan is free for rotation.

Although the apparatus of the invention has been described above by reference to a preferred embodiment of the invention, it should be understood that variations and modifications of the apparatus are possible without departing from the intended scope of the application claims.

The invention claimed is:

1. A fan locking apparatus for holding a fan shaft of a fan against rotation relative to a stationary structure adjacent the fan, the apparatus comprising:
    a support member that is attachable to the stationary structure adjacent the fan;
    a first lock member connected to the support member with the first lock member positioned on a first side of the fan shaft when the support member is attached to the stationary structure adjacent the fan;
    a second lock member connected to the support member with the second lock member positioned on a second side of the fan shaft opposite the first lock member on the first side of the fan shaft when the support member is attached to the stationary structure adjacent the fan;
    at least one of the first and second lock members being movable toward the other of the first and second lock members and toward the fan shaft to engage the fan shaft and hold the fan shaft against rotation, and being movable away from the other of the first and second lock members and away from the fan shaft to disengage the fan shaft and release the fan shaft for rotation.

2. The apparatus of claim 1, further comprising:
    a retainer operable with the first and second lock members to hold the at least one of the first and second lock members in engagement with the fan shaft.

3. The apparatus of claim 1, further comprising:
    a braking material positioned on the at least one of the first and second lock members to engage the fan shaft and hold the fan shaft against rotation when the at least one of the first and second lock members is moved toward the other of the first and second lock members and toward the fan shaft.

4. The apparatus in claim 1, further comprising:
    the support member being attachable to the stationary structure to operatively connect both the first and second lock members to the stationary structure.

5. The apparatus in claim 1, further comprising:
    the first and second lock members being connected to the support member for movement of the first and second lock members between first positions where the first and second lock members are spaced from each other and spaced from the fan shaft, and second positions where the first and second lock members engage against opposite sides of the fan shaft and hold the fan shaft against rotation relative to the stationary structure.

6. The apparatus in claim 5, further comprising:
    the first and second lock members being connected to the support member for pivoting movement.

7. The apparatus of claim 5, further comprising:
    the first lock member having a curved first braking surface that engages against the fan shaft when the first lock member is in the second position of the first lock member; and
    the second lock member having a curved second braking surface that engages against the fan shaft when the second lock member is in the second position of the second lock member.

8. The apparatus of claim 7, further comprising:
    braking materials secured to the first and second lock members, and the first braking surface and the second braking surface being on the braking materials.

9. The apparatus of claim 8, further comprising:
a retainer that is connectable between the first lock member and the second lock member to hold the first and second lock members in the second positions.

10. The apparatus in claim 5, further comprising:
the first lock member being biased toward the first position of the first lock member and the second lock member being biased toward the first position of the second lock member.

11. A fan locking apparatus for holding a fan shaft of a fan against rotation relative to a stationary structure adjacent the fan, the apparatus comprising:
a first lock member having a first braking surface, the first lock member being operatively connectable to the stationary structure adjacent the fan for pivoting movement between first and second positions of the first lock member relative to the stationary structure adjacent the fan, where in the first position the first braking surface of the first lock member is spaced from the fan shaft and in the second position the first braking surface of the first lock member engages with the fan shaft;
a second lock member having a second braking surface, the second lock member being operatively connectable to the stationary structure adjacent the fan for pivoting movement between first and second positions of the second lock member relative to the stationary structure adjacent the fan, where in the first position the second braking surface of the second lock member is spaced from the fan shaft and in the second position the second braking surface of the second lock member engages with the fan shaft; and,
a retainer operable with the first lock member and the second lock member to hold the first lock member in the second position of the first lock member and hold the second lock member in the second position of the second lock member where the first braking surface and second braking surface engage with the fan shaft and hold the fan shaft against rotation.

12. The apparatus of claim 11, further comprising:
a support member that is attachable to the stationary structure adjacent the fan, the first lock member being connected by a pivot connection to the support member and the second lock member being connected by a pivot connection to the support member and the first and second lock members being thereby operatively connectable to the stationary structure.

13. The apparatus of claim 12, further comprising:
the support member being connected to both the first lock member and the second lock member.

14. The apparatus of claim 12, further comprising:
the first lock member and the second lock member being connected to the support member by a single pivot connection.

15. The apparatus of claim 12, further comprising:
the support member positioning the first lock member and the second lock member on opposite sides of the fan shaft.

16. The apparatus in claim 11, further comprising:
the first braking surface being a concave surface and the second braking surface being a concave surface.

17. The apparatus of claim 11, further comprising:
a braking material on the first lock member and the first braking surface being on the braking material; and,
a braking material on the second lock member and the second braking surface being on the braking material.

18. The apparatus of claim 11, further comprising:
the first lock member and the second lock member being biased toward the first positions of the first lock member and the second lock member.

19. A fan locking apparatus for holding a fan shaft of a fan against rotation relative to a stationary structure adjacent the fan, the apparatus comprising:
a support member that is attachable to the stationary structure adjacent the fan, the support member being adjustably movable toward and away from the fan shaft when the support member is attached to the stationary structure;
a first lock member that is mounted on the support member for pivoting movement of the first lock member between a first position of the first lock member relative to the support member and a second position of the first lock member relative to the support member;
a second lock member that is mounted on the support member for pivoting movement of the second lock member between a first position of the second lock member relative to the support member and a second position of the second lock member relative to the support member;
a first braking surface on the first lock member, the first braking surface being positioned on the first lock member to be spaced from the fan shaft in the first position of the first lock member relative to the support member and to engage against the fan shaft in the second position of the first lock member relative to the support member; and,
a second braking surface on the second lock member, the second braking surface being positioned on the second lock member to be spaced from the fan shaft in the first position of the second lock member relative to the support member and to engage against the fan shaft in the second position of the second lock member relative to the support member; and,
a retainer operatively connected to the fist lock member in the second position of the fist lock member and operatively connected to the second lock member in the second position of the second lock member to hold the first braking surface in engagement with the fan shaft and hold the second braking surface in engagement with the fan shaft and thereby hold the fan shaft against rotation relative to the stationary structure.

20. The apparatus of claim 19, further comprising:
a single pivot connection mounts both the first lock member and the second lock member on the support member.

21. The apparatus of claim 19, further comprising:
the first lock member being biased toward the first position of the first lock member and the second lock member being biased toward the first position of the second lock member.

22. The apparatus of claim 19, further comprising:
the retainer being connected between the first lock member and the second lock member in the second positions of the first and second lock members.

23. The apparatus of claim 19, further comprising:
braking materials on the first lock member and the second lock member and the first and second brake surfaces being on the braking materials.

* * * * *